(12) United States Patent
Stoila et al.

(10) Patent No.: US 10,322,554 B2
(45) Date of Patent: Jun. 18, 2019

(54) TIRE BUILDING DRUM

(71) Applicant: The Goodyear Tire & Rubber Company, Akron, OH (US)

(72) Inventors: George Michael Stoila, Tallmadge, OH (US); Viscardo Baldoni, Rovereto (IT); Thierry Royer, Arlon (BE); Dale Eugene Wells, Massillon, OH (US); Thomas Alan Sells, Topeka, KS (US); Minwu Yao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 485 days.

(21) Appl. No.: 14/453,115

(22) Filed: Aug. 6, 2014

(65) Prior Publication Data

US 2015/0059984 A1 Mar. 5, 2015

Related U.S. Application Data

(60) Provisional application No. 61/871,623, filed on Aug. 29, 2013.

(51) Int. Cl.
    *B29D 30/24* (2006.01)
    *B29D 30/26* (2006.01)
    *B29L 30/00* (2006.01)

(52) U.S. Cl.
    CPC ........... *B29D 30/245* (2013.01); *B29D 30/24* (2013.01); *B29D 2030/265* (2013.01); *B29L 2030/00* (2013.01)

(58) Field of Classification Search
    CPC .... B29D 30/24; B29D 30/245; B29D 30/246; B29D 30/248; B29D 30/36; B29D 2030/2614; B29D 2030/2657; B29D 2030/2664; B29D 2030/3221; B29D 2030/3228; B29D 2030/3235; B29D 2030/3242; B29D 2030/325
    See application file for complete search history.

(56) References Cited

U.S. PATENT DOCUMENTS

| | | | |
|---|---|---|---|
| 1,410,309 A * | 3/1922 | Hopkinson | B29D 30/36 156/418 |
| 3,536,566 A | 10/1970 | Frazier et al. | |
| 3,645,826 A | 2/1972 | Henley | |

(Continued)

FOREIGN PATENT DOCUMENTS

| | | |
|---|---|---|
| EP | 544154 | 6/1993 |
| EP | 2572872 A1 | 3/2013 |

(Continued)

*Primary Examiner* — Timothy Kennedy
(74) *Attorney, Agent, or Firm* — June E. Rickey

(57) ABSTRACT

A tire building drum is described that includes an inboard section, a center section and an outboard section. The inboard section has a rotating spindle and a sliding shaft, and the sliding shaft is slidable within the spindle. The inboard section further includes a radially expandable bead lock device mounted on the spindle. The center section has an internal hub mounted on the sliding shaft and further comprises a plurality of tiles that are radially expandable. The outboard section of the drum is mounted on a distal end of the sliding shaft, and further includes a radially expandable bead lock device. The center section and the outboard section are each axially movable by sliding of the sliding shaft.

34 Claims, 17 Drawing Sheets

(56) References Cited

U.S. PATENT DOCUMENTS

| | | | |
|---|---|---|---|
| 3,674,604 A * | 7/1972 | Gazuit | B29D 30/245 |
| | | | 156/415 |
| 3,833,444 A | 9/1974 | Mallory | |
| 3,853,653 A | 12/1974 | Olbert | |
| 3,862,871 A * | 1/1975 | Held | B29D 30/36 |
| | | | 156/133 |
| 3,929,540 A | 12/1975 | Held | |
| 4,226,656 A * | 10/1980 | Appleby | B29D 30/32 |
| | | | 156/132 |
| 4,239,579 A | 12/1980 | Felten | |
| 4,416,720 A | 11/1983 | Baldoni | |
| 4,447,171 A | 5/1984 | Baldoni et al. | |
| 4,470,867 A * | 9/1984 | Caretta | B29D 30/20 |
| | | | 156/126 |
| 4,726,861 A | 2/1988 | Vorih et al. | |
| 4,780,170 A * | 10/1988 | Landsness | B29D 30/247 |
| | | | 156/415 |
| 5,225,208 A | 7/1993 | Minaudo et al. | |
| 5,234,187 A * | 8/1993 | Teppo | A47B 9/06 |
| | | | 248/161 |
| 5,268,057 A | 12/1993 | Nojiri | |
| 5,324,375 A * | 6/1994 | Kim | B29C 43/3642 |
| | | | 156/110.1 |
| 5,354,405 A | 10/1994 | Byerley | |
| 5,755,922 A | 5/1998 | Baldoni et al. | |
| 5,915,611 A | 6/1999 | Baldoni et al. | |
| 6,360,802 B1 | 3/2002 | Baldoni et al. | |
| 6,676,788 B1 * | 1/2004 | Roedseth | B29D 30/26 |
| | | | 156/123 |
| 7,288,160 B2 | 10/2007 | Roedseth | |
| 9,290,052 B2 | 3/2016 | Leendertse et al. | |
| 2002/0040753 A1 | 4/2002 | Baldoni et al. | |
| 2006/0130960 A1 * | 6/2006 | Conger | B29D 30/244 |
| | | | 156/131 |
| 2006/0137825 A1 | 6/2006 | Roedseth | |
| 2007/0187018 A1 * | 8/2007 | Lacagnina | B29D 30/20 |
| | | | 156/111 |
| 2009/0139660 A1 | 6/2009 | Baldoni et al. | |
| 2009/0151873 A1 * | 6/2009 | Pinto | B29D 30/246 |
| | | | 156/416 |
| 2009/0304841 A1 * | 12/2009 | Eigler | B29C 45/32 |
| | | | 425/150 |
| 2010/0175813 A1 * | 7/2010 | Marangoni | B29D 30/245 |
| | | | 156/123 |
| 2012/0111480 A1 * | 5/2012 | Baldoni | B29D 30/244 |
| | | | 156/110.1 |

FOREIGN PATENT DOCUMENTS

| | | |
|---|---|---|
| GB | 1043423 | 9/1966 |
| JP | 1973019670 A | 10/1974 |
| JP | 01237127 A | 9/1989 |
| JP | H107024931 A | 1/1995 |
| JP | 2002067184 | 3/2002 |
| JP | 2006143078 A | 6/2006 |
| JP | 2009131988 | 6/2009 |
| WO | 0108874 A1 | 2/2001 |
| WO | 2005097478 A1 | 10/2005 |
| WO | 2009128103 A1 | 10/2009 |

\* cited by examiner

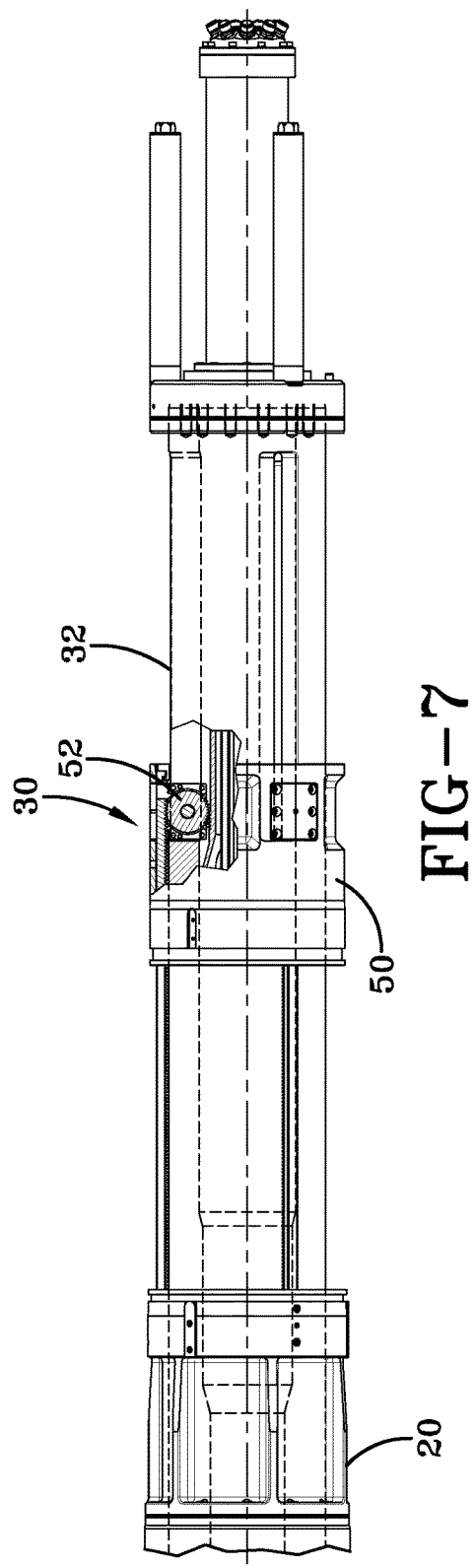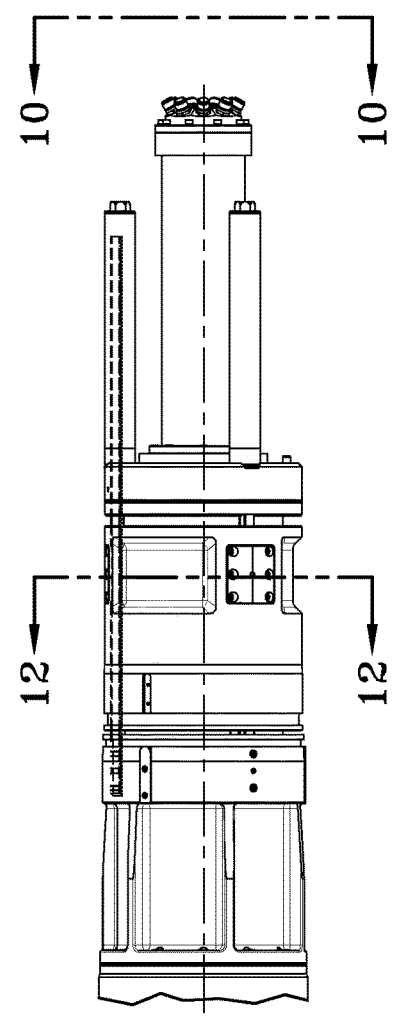

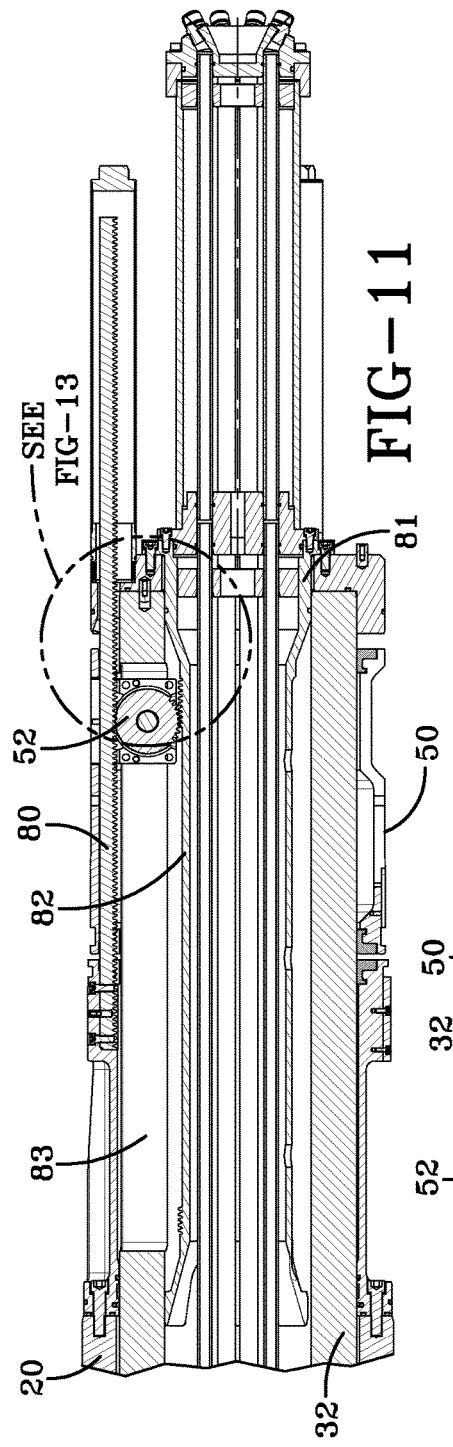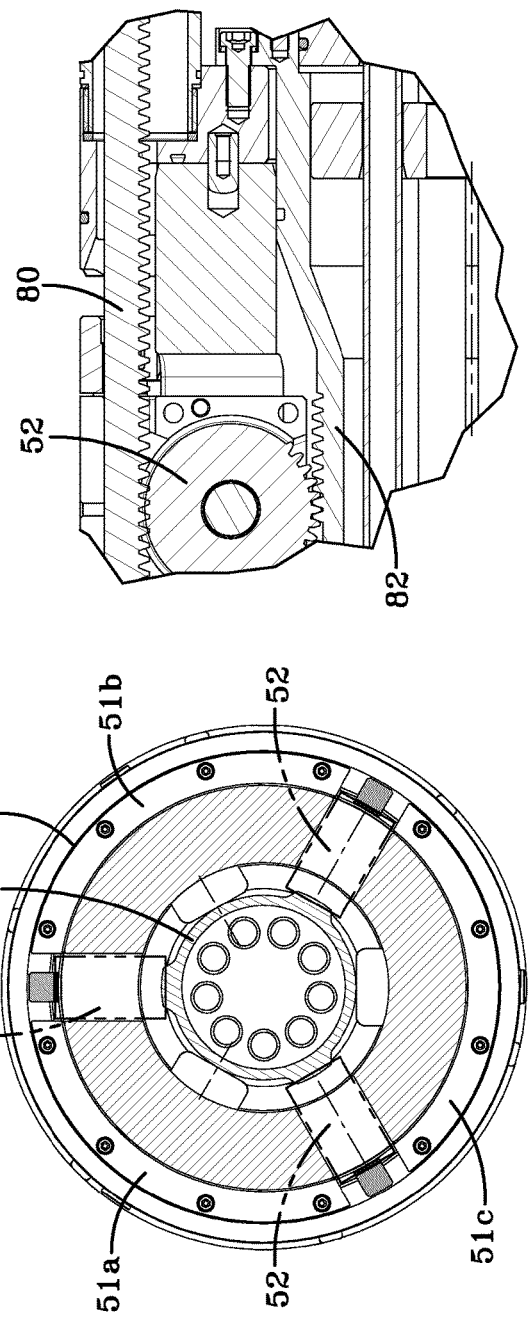

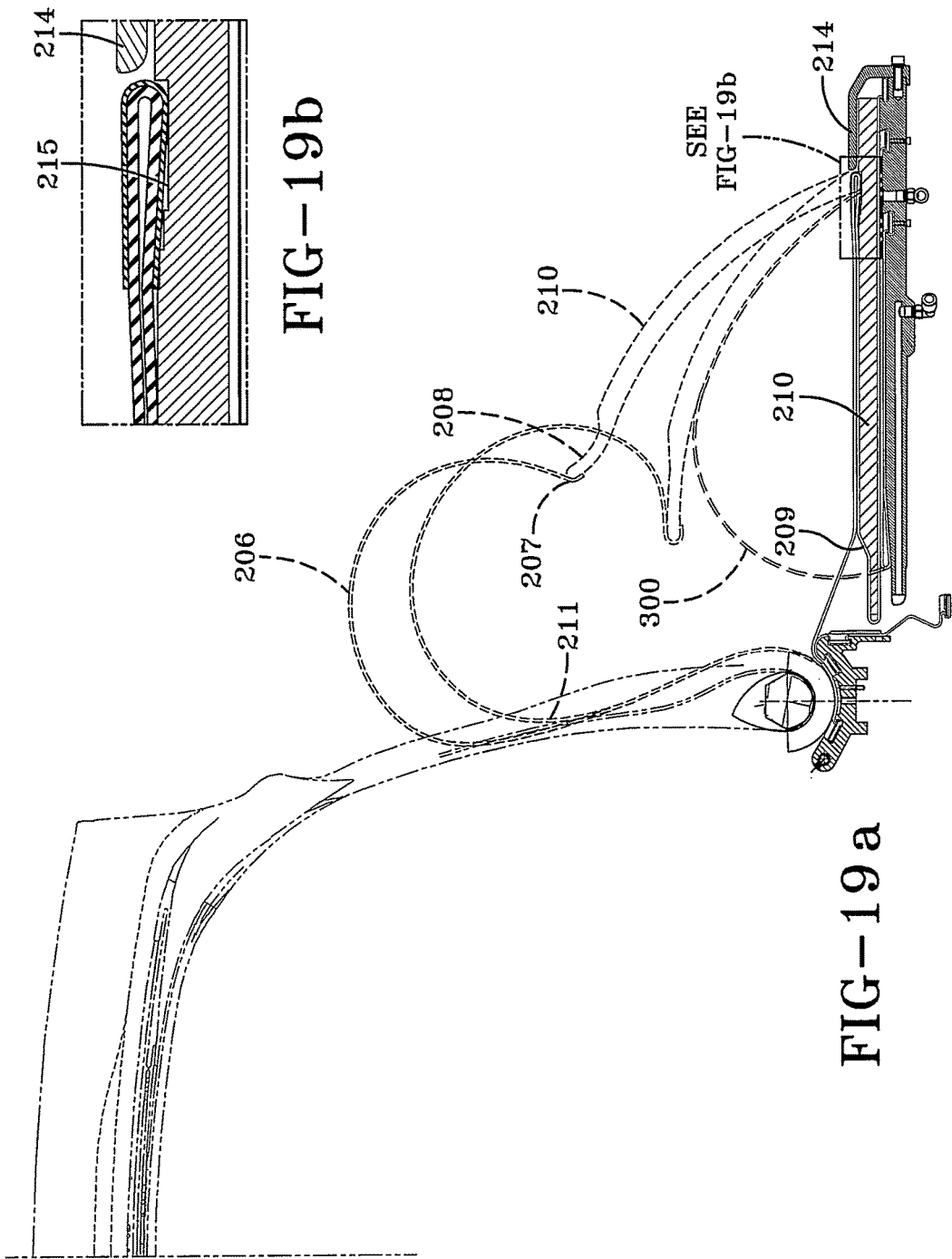

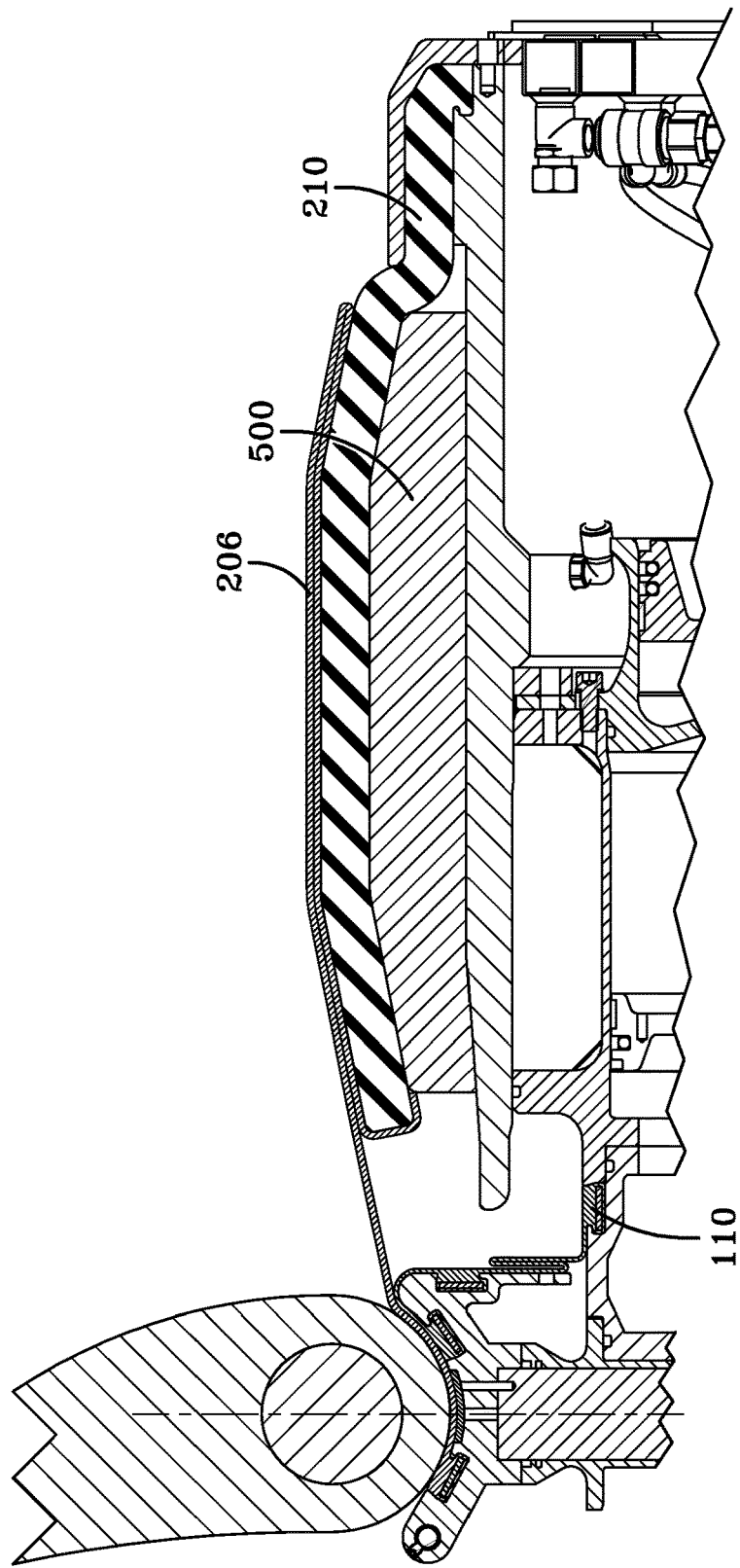

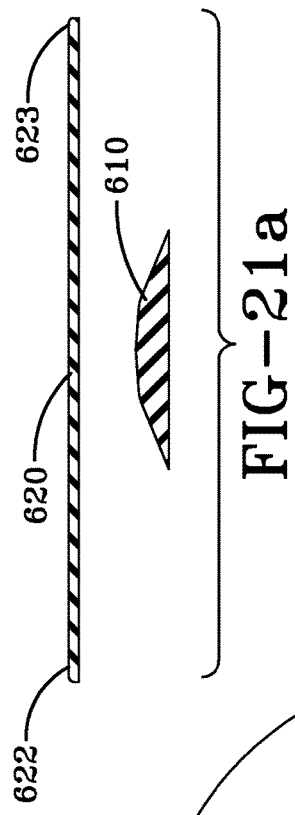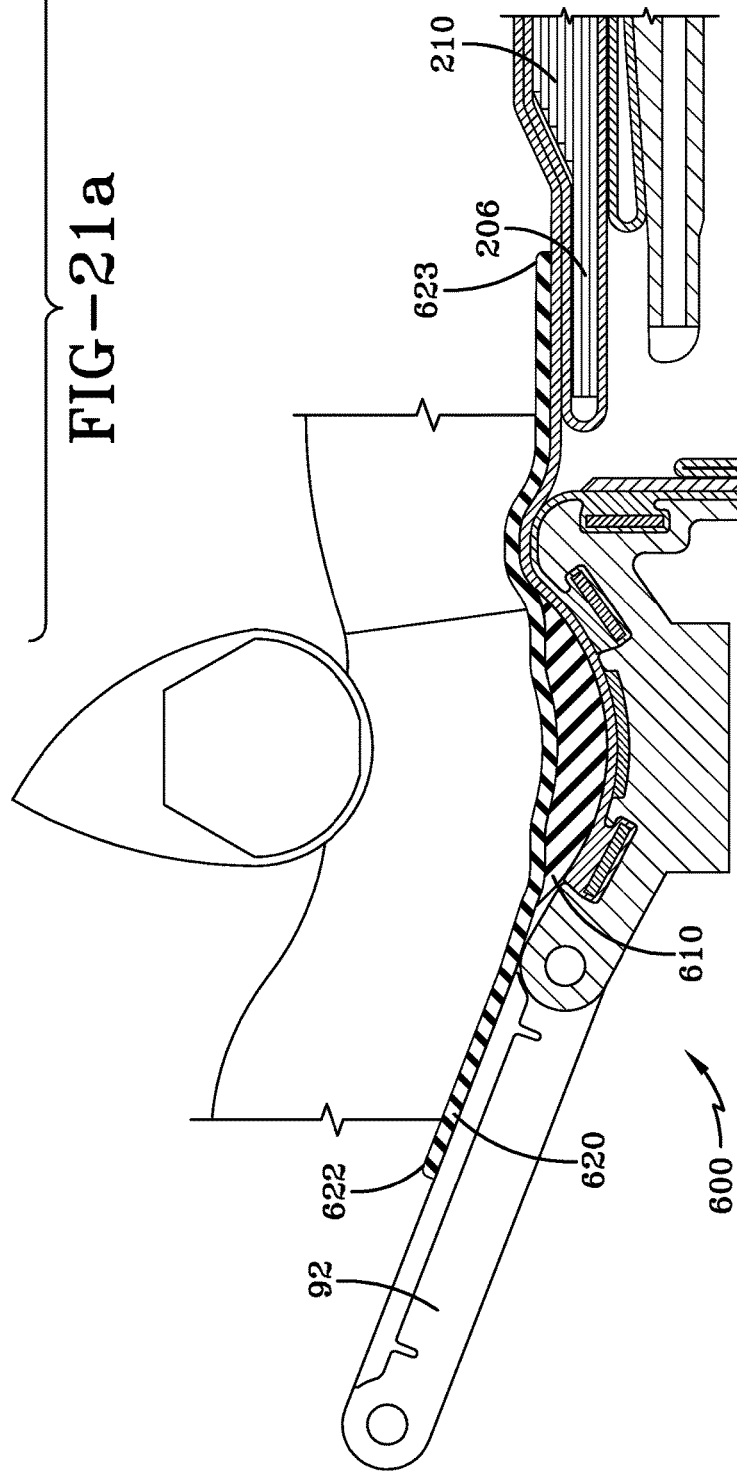

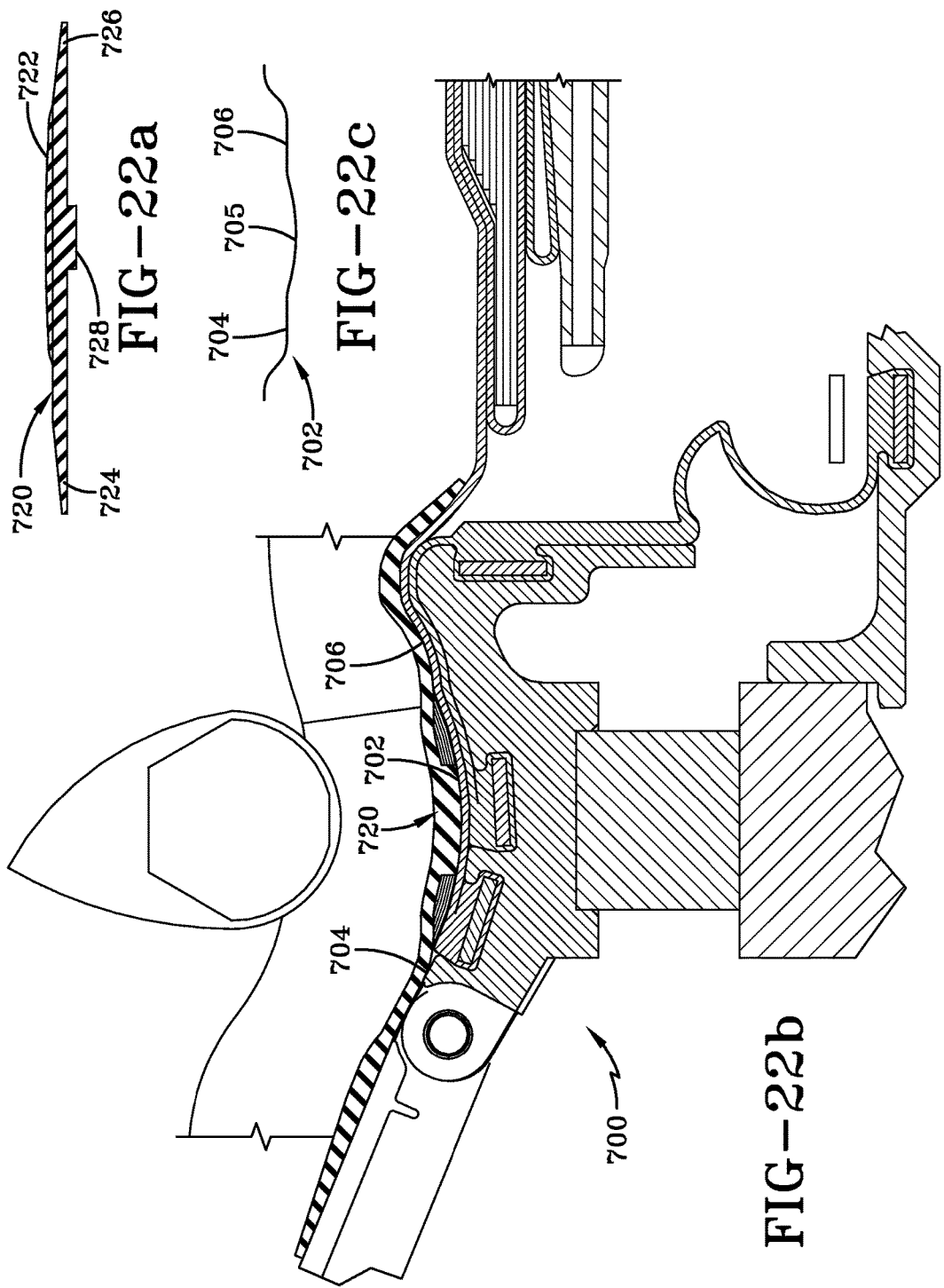

TIRE BUILDING DRUM

FIELD OF THE INVENTION

The invention relates to a tire building drum, more particularly to a tire building drum for large off the road tires.

BACKGROUND OF THE INVENTION

The manufacture of tires, particularly large tires, involves many steps. For very large tires having a size R 57 inch or larger, the manufacturing process typically involved the making of a "band" on a band builder machine. A band typically includes a liner, squeegee, insert and ply. After the band was made, it was typically removed from the band builder machine and stored on a rack. One problem with band storage is that the band typically shrinks. In order to overcome this problem, the stored band was transported to a band expander, wherein the band was expanded and then installed on a first stage drum. The first stage drum would then process the band by adding the beads onto the green carcass. The carcass would then be removed, and transferred to a second stage drum. The second stage drum would then shape the carcass, apply the belts and then apply the tread. The prior art process thus requires multiple building stages and the transfer of the components from machine to machine. Thus a full stage tire building drum is desired which solves the inefficiencies as described above. This requires that the tire building drum be capable of axial expansion and contraction as well as radial expansion/contraction. Further, it is important to maintain a positive bead lock during the entire tire building process, including the tire shaping, so that the ply cord length is maintained, resulting in good tire uniformity.

Definitions

For ease of understanding this disclosure, the following items are defined:

"Apex" means an elastomeric filler located radially above the bead and interposed between the plies and the ply turn-up.

"Axial" and "axially" means the lines or directions that are parallel or aligned with the longitudinal axis of rotation of the tire building drum.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire building drum.

"Radial Ply Tire" means a belted or circumferentially restricted pneumatic tire in which at least one layer of ply has the ply cords extend from bead to bead at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which:

FIG. 7 is a side view of a sliding shaft shown in the expanded position;

FIG. 8 is a side view of the sliding shaft shown in the axially contracted position;

FIG. 11 is a cross-sectional side view of the sliding shaft;

FIG. 12 is a cross-sectional view in the direction 12-12 of FIG. 8;

FIG. 13 is a close up view of the encircled region of FIG. 11 illustrating the pinion and rack assemblies;

FIG. 19a is a close up view of the bead lock and bladder assembly, with the bladder assembly shown in the actuated state;

FIG. 19b is a close up view of the bubble of FIG. 19a;

FIG. 20 is a second embodiment of a bladder assembly;

FIG. 21a is an exploded view of a seal for a bead lock mechanism of FIG. 21b;

FIG. 21b is a second embodiment of a bead lock assembly;

FIG. 22a is a third embodiment of a seal for the bead lock mechanism of FIG. 22b;

FIG. 22b is a third embodiment of a bead lock assembly.

FIG. 22c is the contour of the bead saddle.

DETAILED DESCRIPTION OF THE INVENTION

Figure 9:
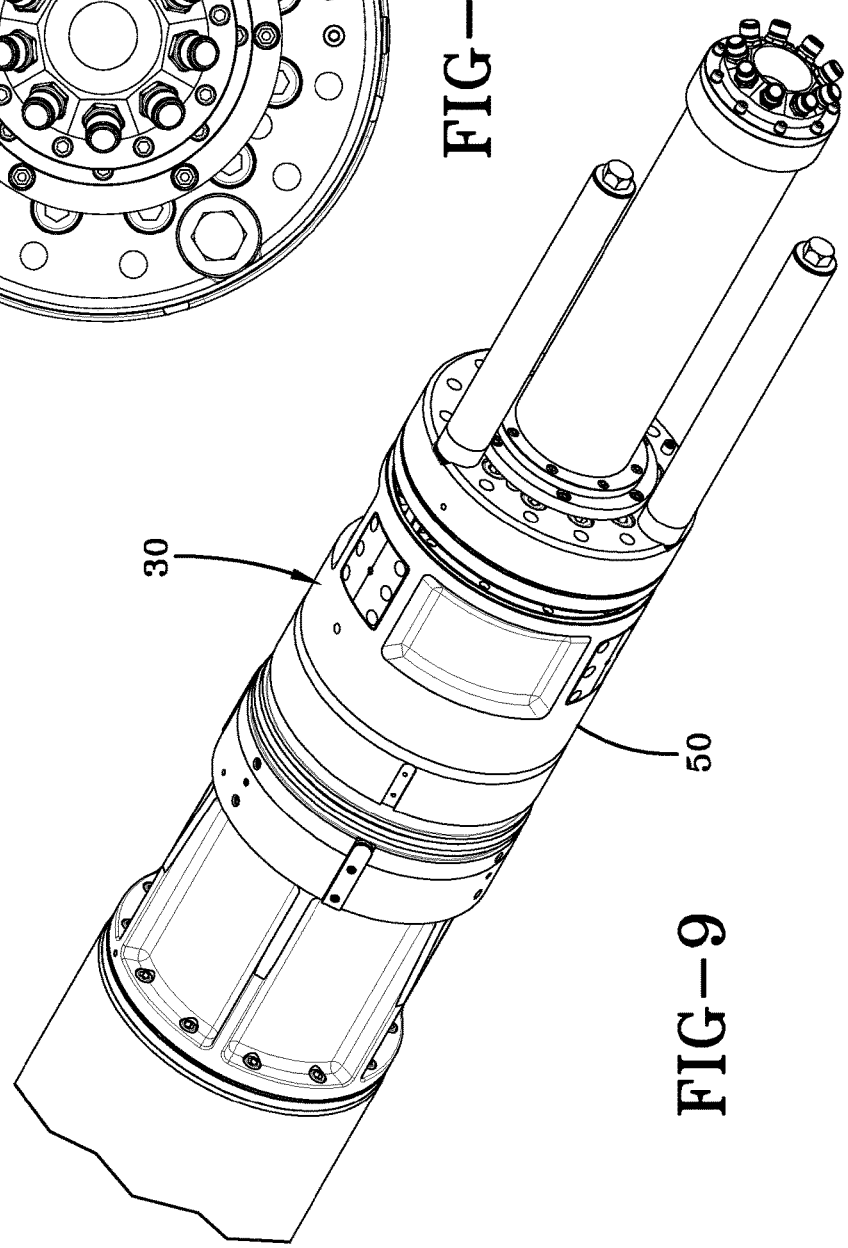
FIG. 9 is a perspective view of the sliding shaft.

With reference to the Figures, a full stage tire building drum 10 of the present invention is illustrated. The drum 10 has an inboard section 12 that is axially fixed, and an axially movable center section 13 and an outboard section 14 which axially moves towards and away from the inboard section 12 in order to expand and contract the drum. These three sections 12, 13, 14 are mounted on an internal support assembly 30 which allow rotation and axial movement of the drum sections. The internal support assembly 30 as shown in FIGS. 7-9, include a rotating spindle 20, a center deck hub 50, and a sliding shaft 32. The internal support assembly 30 has internal mechanisms to adjust the centerline as the drum is axially expanded and contracted. All of these sections are explained in more detail, below.

Inboard Section

Figure 1:
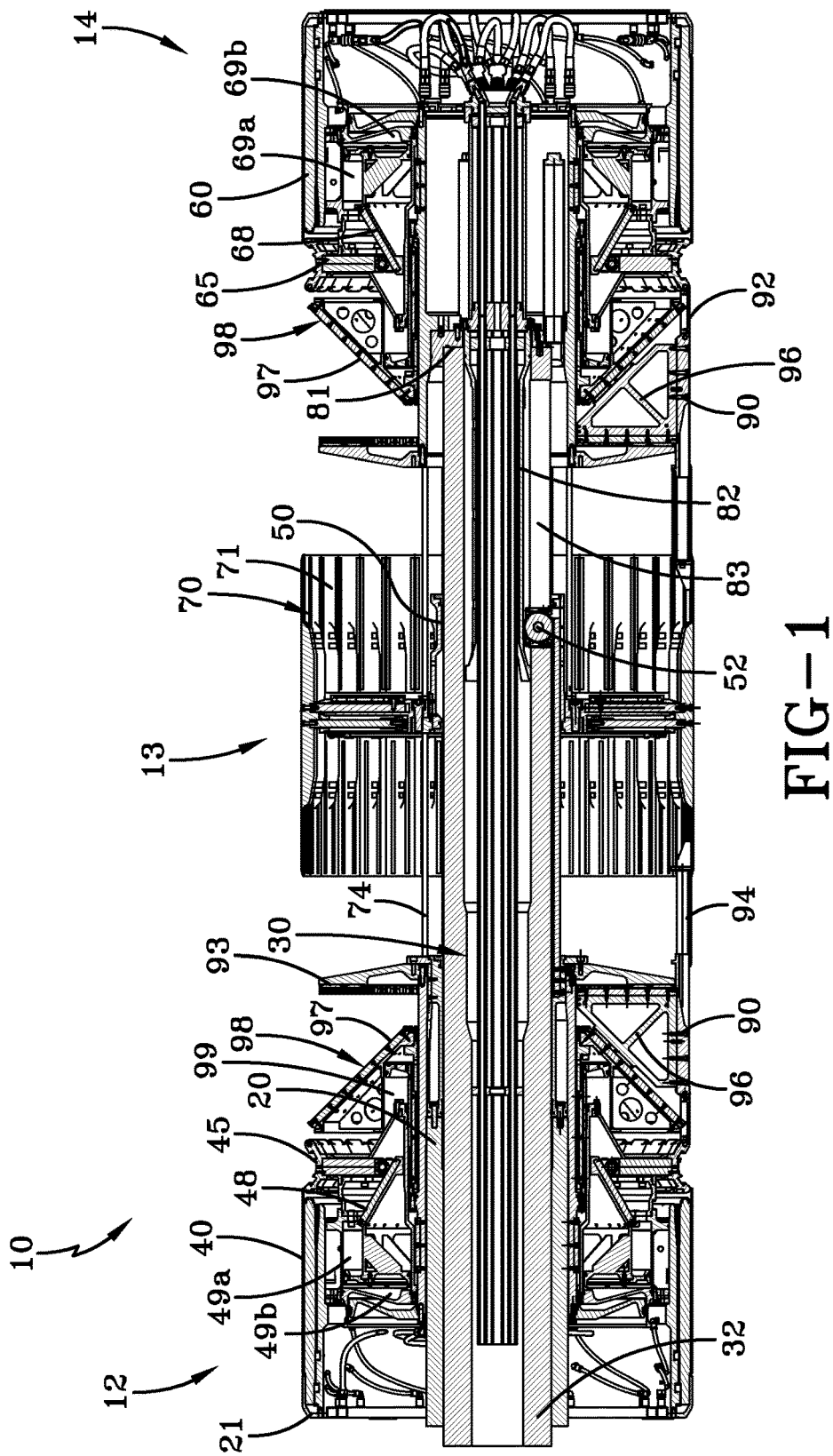
FIG. 1 illustrates a front cross-sectional view of a tire building drum of the present invention shown in an axially expanded form.
Figure 2:
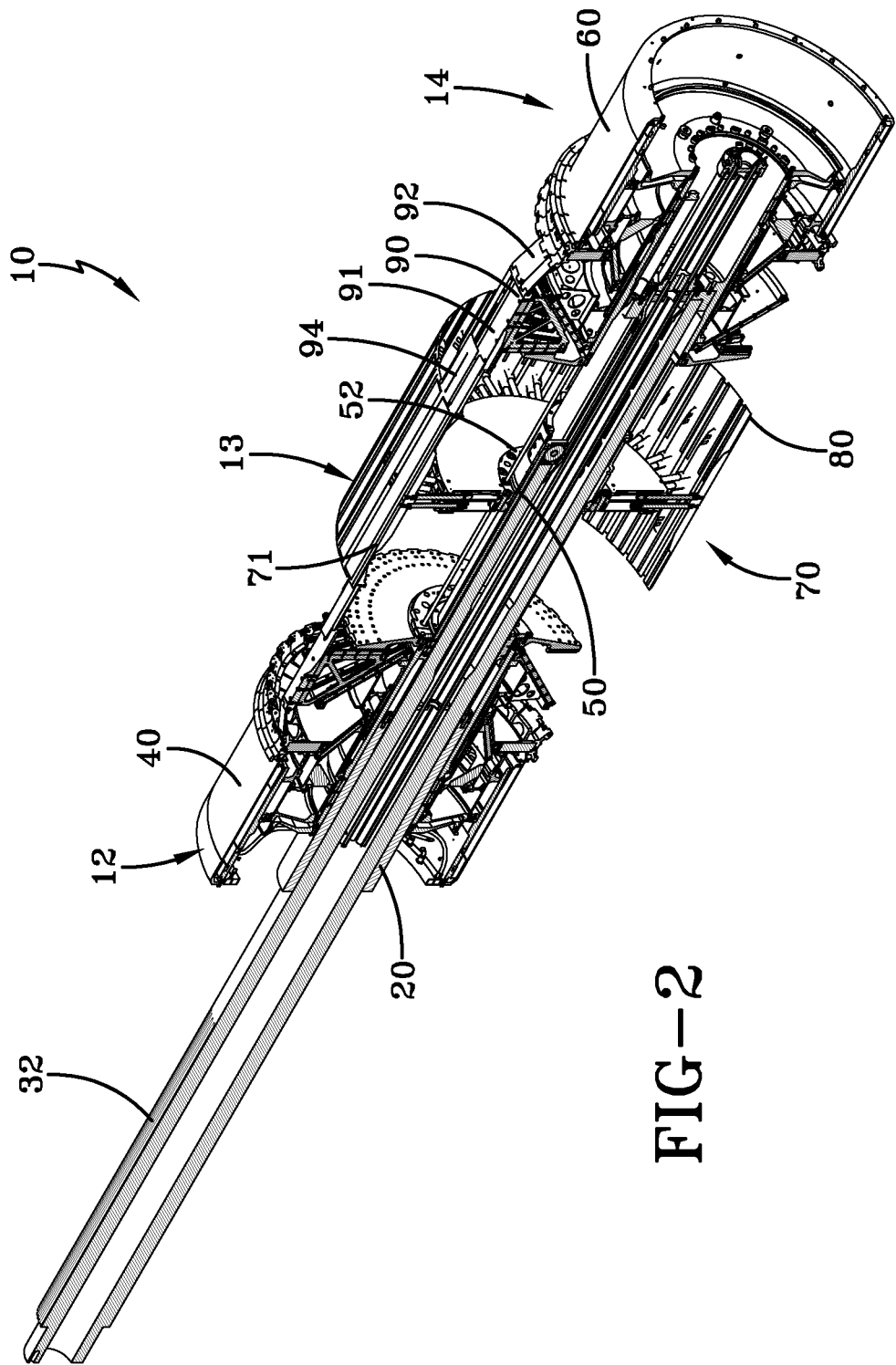
FIG. 2 illustrates a perspective cross-sectional view of the tire building drum of FIG. 1.

As shown more particularly in FIG. 1 the inboard section 12 of the drum is located on the inboard end of the drum and is axially fixed in location. The inboard section includes a cylindrically shaped main spindle 20 which functions to rotate the entire drum assembly 10. The main spindle is rotationally driven by a drive mechanism coupled to the main spindle of a turret via bearings (not shown). An inboard bead lock and turn-up unit 40 is mounted on the spindle 20 and is locked with a key so that the turn up unit rotates in unison with the spindle. The inboard bead lock and turn-up unit 40 is also axially fixed. The main spindle 20 supports an internally mounted sliding shaft 32 that is slidable in the axial direction in order to change the width of the drum. The main spindle is connected to the sliding shaft 32 by a splined hub (not shown) which allows the sliding shaft to rotate with the spindle, and also to axially move.

Center Section

The middle section 13 of the drum 10 includes a center deck hub 50 mounted on the sliding shaft 32. The middle section 13 is secured to the center deck hub by a two section ring (not shown). As shown in FIGS. 11-13, the center deck hub 50 is secured to the sliding shaft 32 by rotatable pinion gear assemblies 52 and a moveable rack 82, and keys fitted to slot in the moveable shaft (not shown). The center deck hub moves half the axial distance that the sliding shaft moves, when the drum expands or contracts in the axial direction. The center deck hub also rotates with the sliding shaft. The fixed rack is rigidly connected to the main spindle, so that the fixed rack spins with rotation of the spindle, although the fixed rack does not move axially. The fixed rack 80 is mounted over the outer surface of the sliding shaft 32. A moving rack 82 is mounted internal to the sliding shaft. The moving rack has one end 81 affixed internally to the outboard unit 60, so that axial movement of the moving rack 82 also moves the outboard unit. The center deck hub has at least two, preferably three rotatable pinion gears 52. The hub pinion gears 52 are mounted for mechanical engagement with the fixed rack 80 and the moving rack 82. The sliding shaft has slots 83 to allow communication between the pinion gears, fixed rack, and moving rack 82. A cross-sectional view of the center deck hub 50 also known as sliding hub is shown in FIG. 12. The one or more pinion gears 52 have teeth that mesh with mating teeth on the fixed rack and the movable rack. When the one or more pinion gear rotate, the pinion teeth engage the teeth of the movable rack 82 mounted in the sliding shaft 32, and also engage the fixed rack 80. Depending on the direction of rotation of the pinion gears with respect to the fixed rack, this rotation causes the sliding hub 50 to slide axially inboard or outboard depending upon the direction of rotation. The moveable shaft 32 is axially relocated by an external yolk and ball screw assembly (not shown).

Figure 6:
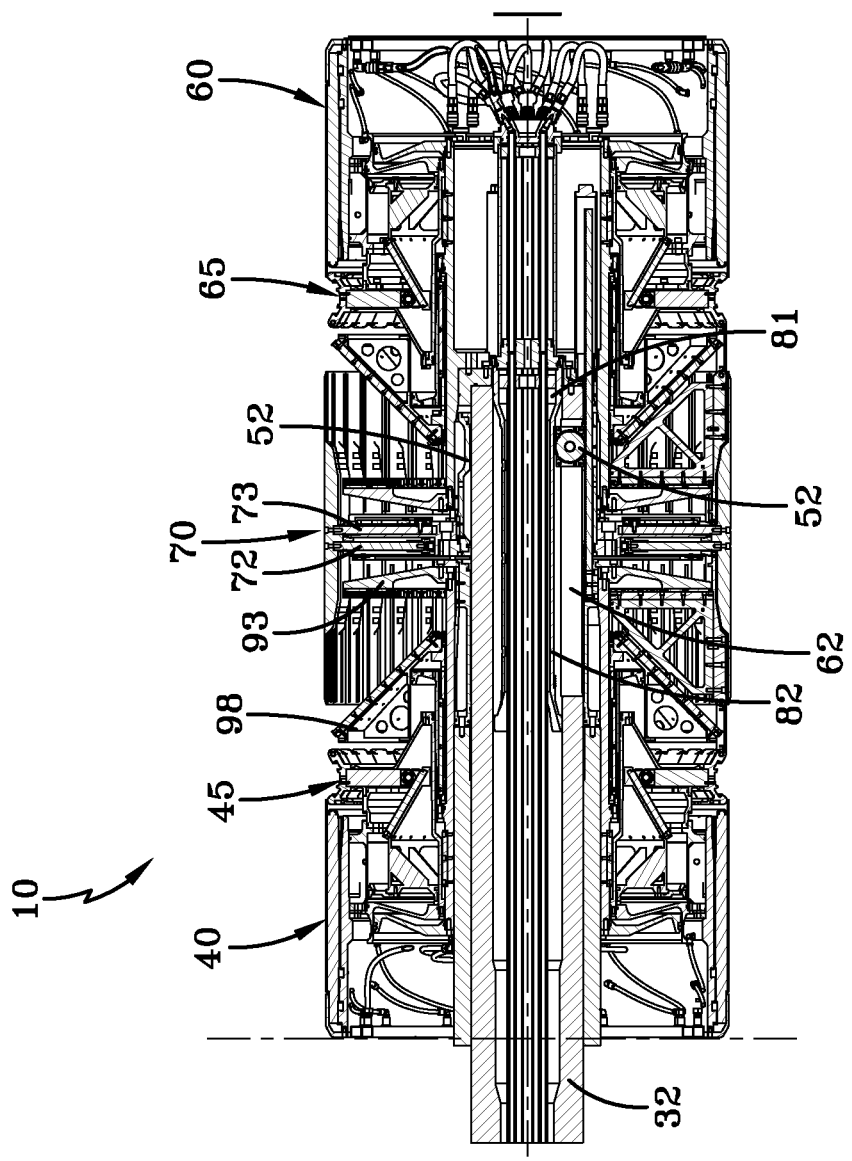
Figure 10:
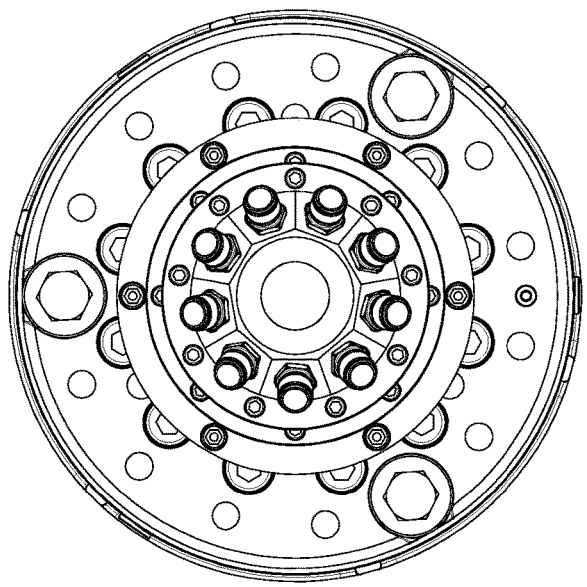
FIG. 10 is an end view of the sliding shaft of FIG. 9.

The drums rack and pinion device 32, 80, 82, 52 offsets the axial movement of the sliding shaft. This rack and pinion device allows the center deck unit to stay centered on the drum. The moveable shaft 32 when relocated 1 unit of measure causes the central sliding hub 50 to relocate ½ unit of measure in the same direction. For example, if the outboard bead lock and turn-up unit 60 is moving axially 100 mm towards the inboard end (drum width decreased by 100 mm), the center section has to move only 50 mm in the same direction, to re-center the drum. Thus comparing FIG. 3 with the drum in the axially expanded position with the axially collapsed drum of FIG. 6, it is apparent that the inboard unit has remained axially fixed. It is also apparent that the center deck section has axially moved into abutment with the inboard unit. The sliding shaft has moved axially inward, bringing the outboard end into abutment with the center deck. The outboard end has moved twice the distance of the center section. Thus as the pinion gears rotate, the outboard end moves in two axial units while the center hub section moves one axial unit in the same direction.

Center Section

Mounted to the center deck hub 50 is a center deck unit 70 which contributes to forming the middle section of the tire building drum. The center deck unit 70 extends between the Inboard and Outboard Units 40, 60, in order to have a flat drum surface when applying the different components. The center deck unit includes a plurality of tiles 71 which overlap with the tiles of the inboard & outboard unit. The tiles 71 are mounted on two guide rods 72, 73 which are mounted within radially oriented channels 74, 75 of the center deck unit 70. A cam follower bearing 77 is mounted to each outboard guide rod 73 and slides within radial slot 76. A timing ring 78 is mounted adjacent the outboard side of the main disk 73, and includes a plurality of timing slots 79. The cam follower bearing 77 is mounted for sliding in each timing slot 79, so that when the guide rods are actuated radially outward by air pistons (not shown), the timing ring ensures that the outboard guide rods 73 all move together.

The center guide rods 72, 73, one pair, (not shown) have one unique set of internal drillings and external connections to create a vacuum chamber on one of the central tiles 71. This vacuum chamber on the surface of a tile 71 is used for the application of the inner liner gum material.

Inboard and Outboard Bead Lock and Turn Up Unit

The inboard bead lock and turn up unit is mounted upon the main spindle. The Inboard and Outboard units 40, 60 are the same, except for the internal drum hub. Each unit has a bead locking mechanism, formed of a plurality of radially expanding bead locks 45, 65. The bead locks 45, 65 are radially expandable by means of a conical actuator 48, 68 and actuated radially outwards by pneumatic circumferential cylinder 49B, 69B, and actuated radially inward by cylinders 49a and 69a.

Figure 14:
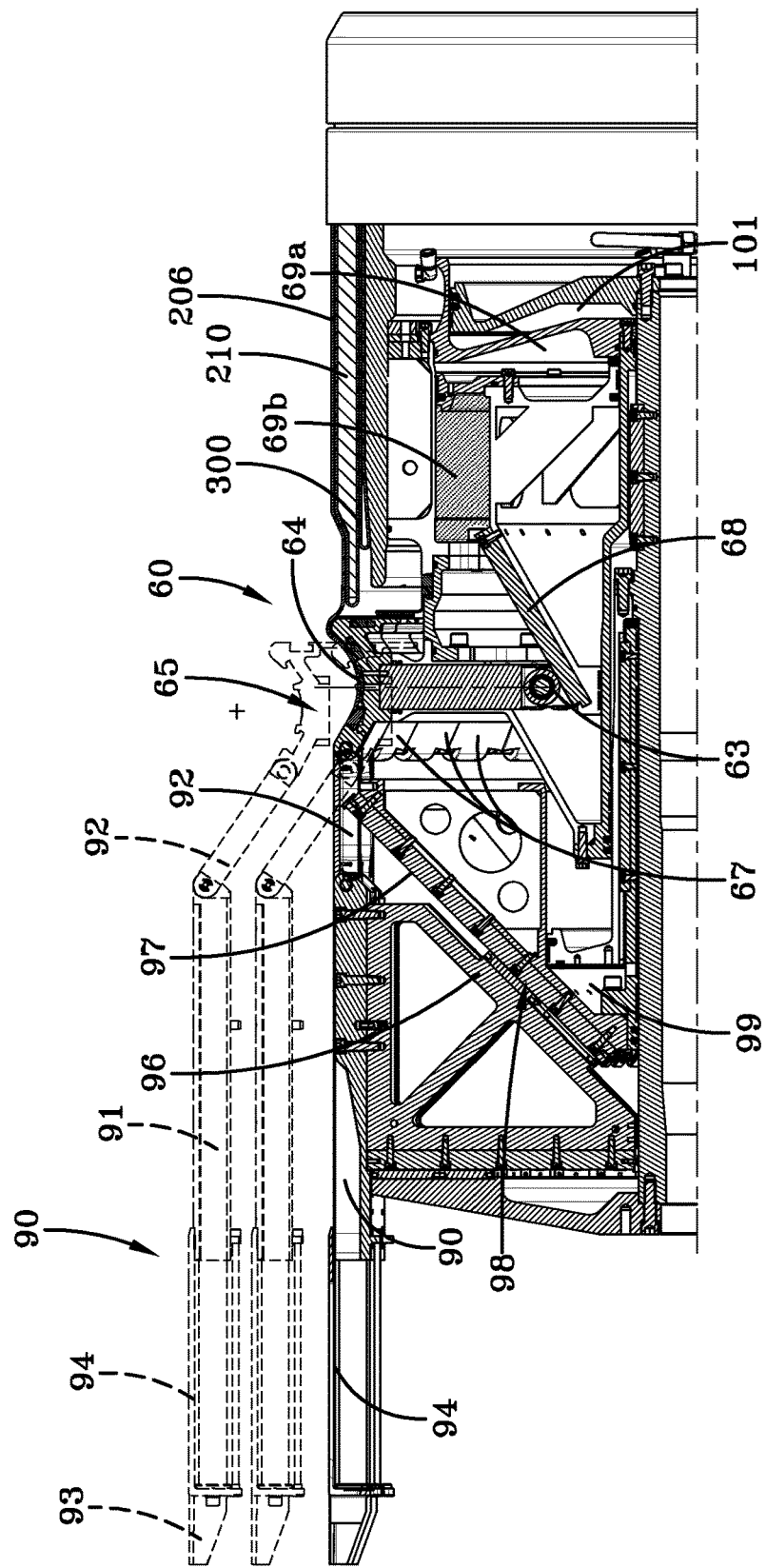
FIG. 14 is a cross-sectional view of the outboard end of the drum shown with the bead mechanism and the tiles shown in the expanded forms in phantom.
Figure 15:
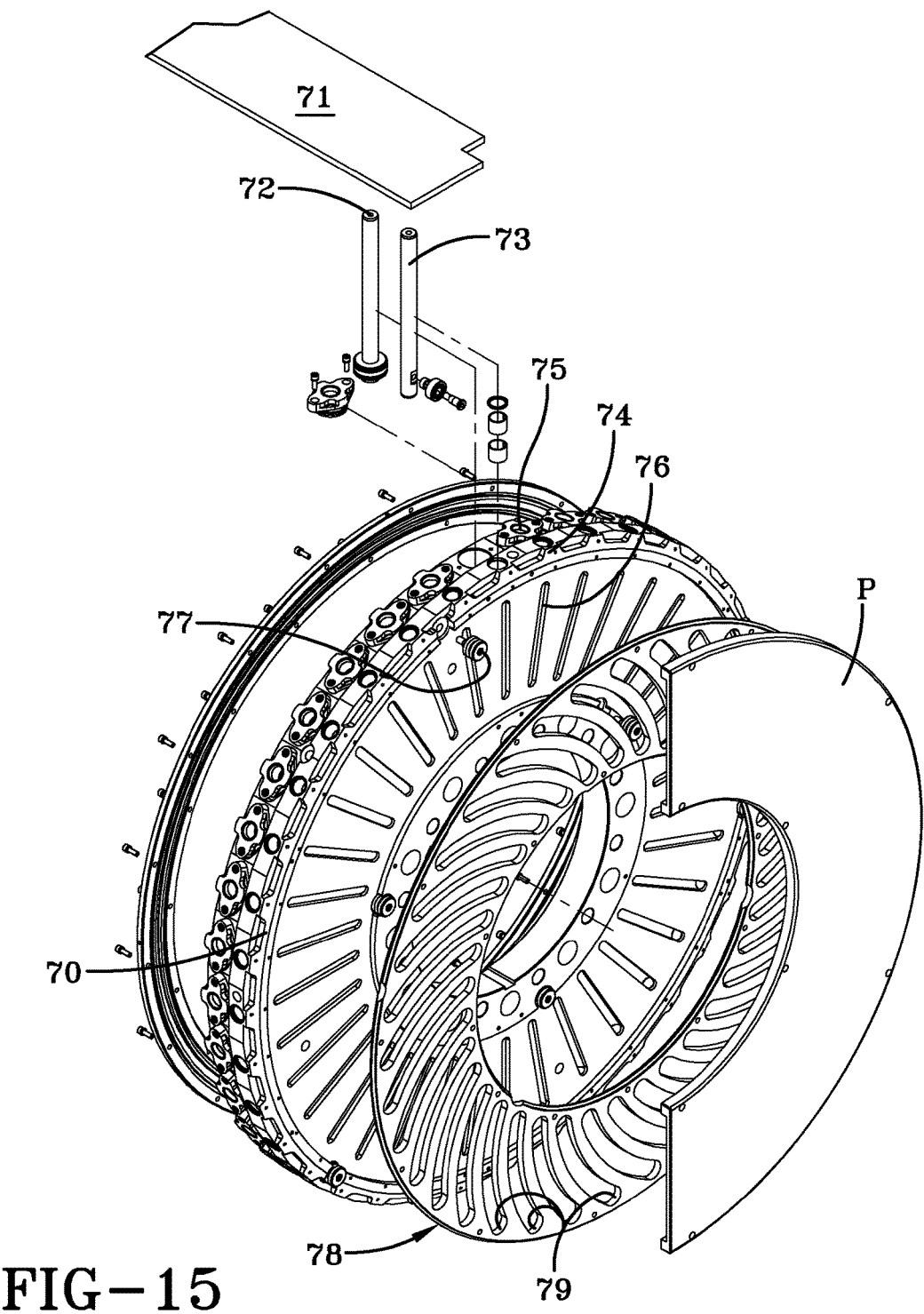
FIG. 15 illustrates an exploded perspective view of the center deck actuator mechanism.
Figure 17:
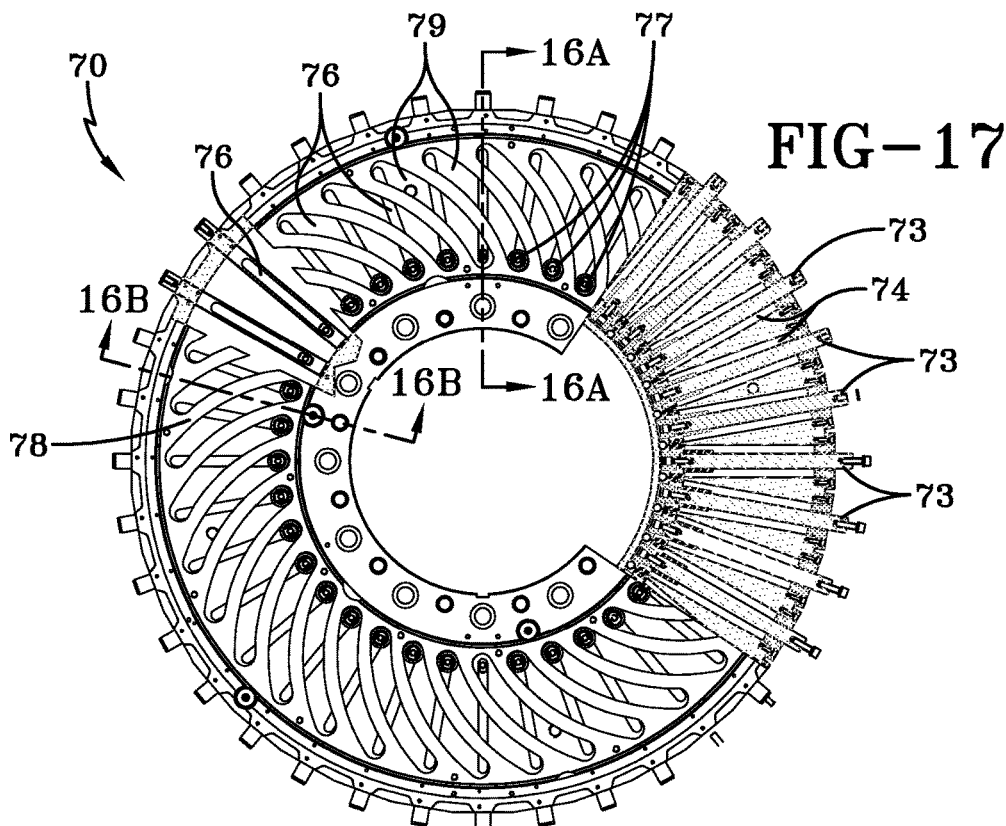
FIG. 17 is a side view of the outboard end of the center deck mechanism of FIG. 15.
Figure 16A:
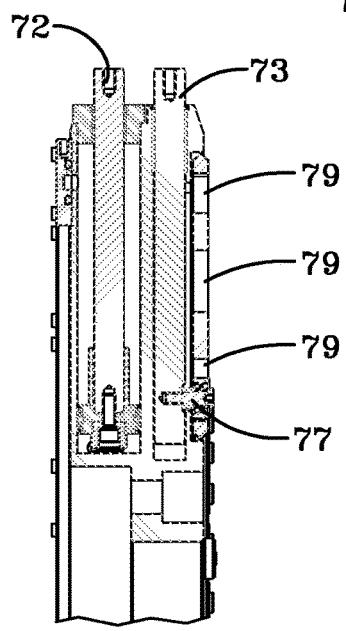
FIG. 16*a* is a side view of the center deck mechanism of FIG. 17 in the direction 16*a*-16*a*.
Figure 16B:
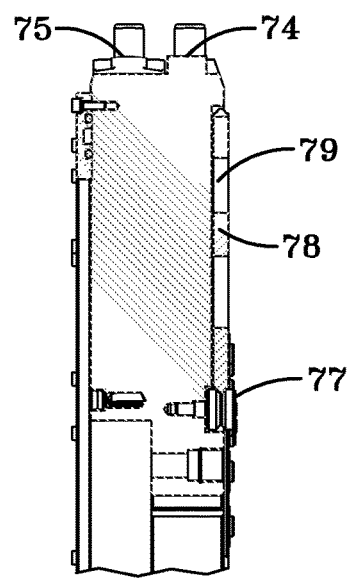
FIG. 16*b* is a side view of the center deck mechanism of FIG. 17 in the direction 16*b*-16*b*.
Figure 18:
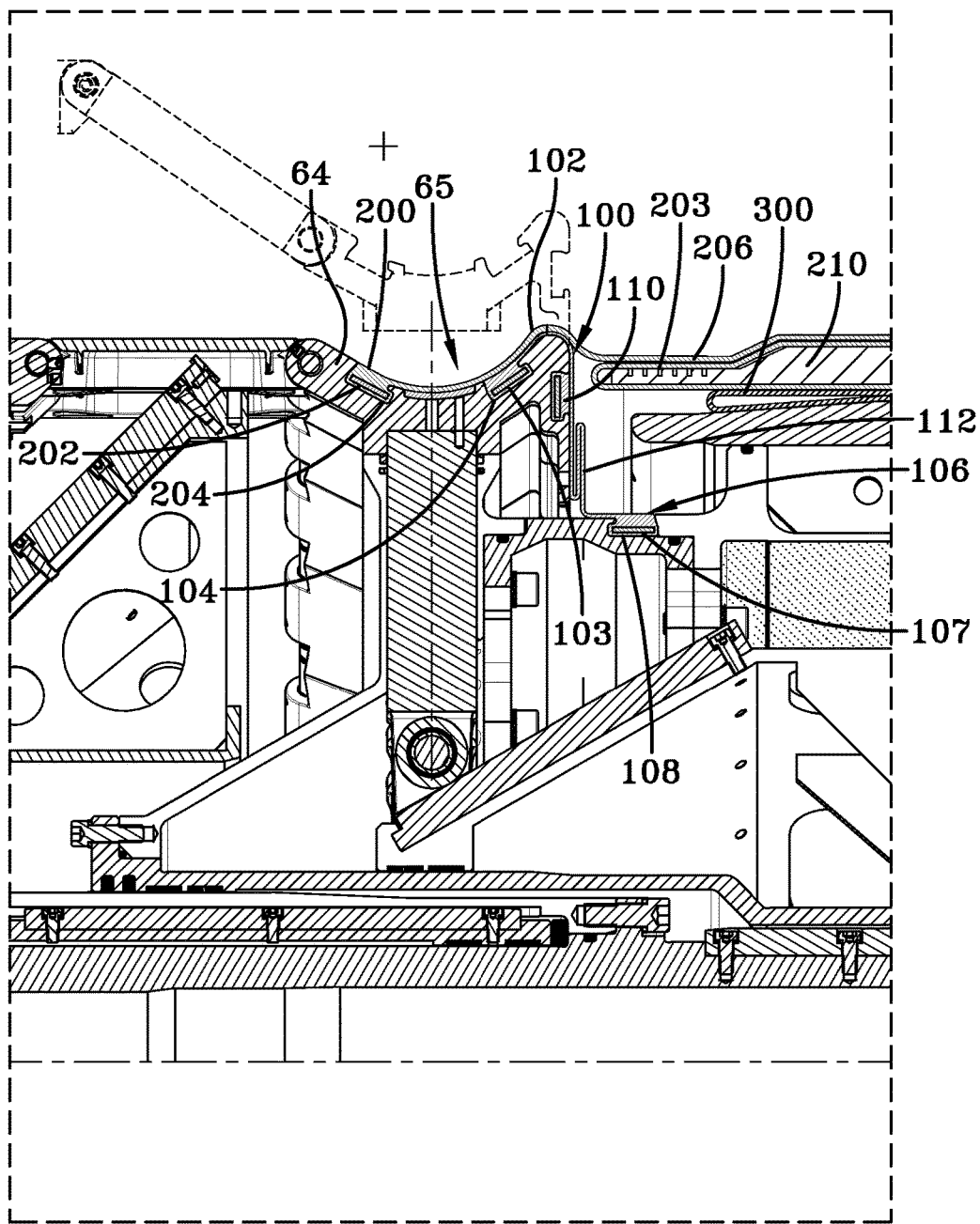
FIG. 18 is a close up view of the bead lock of the present invention.

As shown in FIGS. 14 and 18, the bead locks have a curved bead seat 64 for receiving the beads. A first end 102 of a sealing membrane 100 is mounted on the surface of the curved bead seat 64. The sealing membrane 100 is preferably annular. The sealing membrane 100 is a highly specialized sealing membrane that extends from the bead locks to the drum body and functions to maintain the carcass inflation and to prevent carcass shaping air from entering the bladder inflation system. The first end 102 has an enlarged foot 103 which is received within a mating receptacle 104 on the bead seat 64. The membrane 100 has a second end 106 having a second enlarged foot 107 that is received in a mating receptacle 108 on an interior portion of the bead lock and turn up unit, adjacent the bead locks. The membrane is comprised of a third foot 110 which is received in a mating receptacle on the radial oriented surface of the bead lock. It is preferred that the enlarged feet 103,107,110 are reinforced with one or more layers of reinforcement, preferably steel ply. The membrane further comprises an expansion portion 112 wherein the membrane has one or more folds stacked adjacent each other to allow the membrane to expand radially and circumferentially when the bead locks are actuated. The sealing membrane 100 is made of rubber reinforced with textile plies from the first end to the second end. The expansion portion 112 of the sealing membrane further comprises one or more layers of steel ply that functions like a spring to snap back into place upon contraction of the sealing membrane during movement of the bead locks.

As shown in FIGS. 14 and 18, a climbing bladder 206 is positioned over a portion of the sealing membrane 100. The climbing bladder has a first end 202 having a heel 204 which is mounted in the bead seat 64. The heel 204 is preferably reinforced with one or more layers of reinforcement, preferably steel reinforcement. The climbing bladder 200 extends across the bead seat 64 over a portion of the sealing membrane, and then further extends in an axial direction along the upper surface of the tire building drum. The climbing bladder has a second end 207 that is wrapped around the first end or nose 208 of a support beam 210. The climbing bladder is preferably made of reinforced ply, preferably reinforced with textiles arranged in a cross angle ply, +10 degrees, −10 degrees.

The support beam 210 facilitates the radial climb of the climbing bladder 200 during inflation for turnup of the ply. The support beam is formed of reinforced elastomer or rubber, preferably with one or more layers of steel reinforcement ply. At least two layers of crossed steel plies are preferred, with the steel reinforcements preferably crossed at a low angle, in the range of +/−5 to 30 degrees, more preferably +/−5-12 degrees. The second end of the support beam is mounted within a support collar 214. The second end is preferably angled to facilitate the folding of the climber bladder over the surface of the support beam. The first end or nose of the support beam has a substantially reduced cross-sectional area, preferably with a stepped profile 209. It is preferred that the cross-sectional area of the nose is in the range of about 30% to 60%, more preferably 40-60%, of the support beam cross sectional area. The reduced cross-sectional area of the support beam allows the nose to bend, facilitating the outward radial movement of the climbing bladder. The nose 208 of the support beam may further optionally comprise serrations or cuts 203 on the outer radial surface to further facilitate bending of the nose of the support beam. The cuts on the nose 208 facilitate the nose bending radially inward prior to turnup, and to facilitate the nose bending radially upward during turnup. This bending of the nose of the support beam solves the problem of wrinkling or folds in the chipper and chafer tire components. The low profile nose that can bend or yield allows the chipper and chafer reduces the tendency of the chipper and chafer ends to stretch into a conical shape due to engagement with a high profile nose during inflation of the bladders and turnup. If the chipper and chafer ends are stretched past their yield point during turnup, they will not return back to their original shape, resulting in nonuniformity. The low profile nose allows the chipper/chafer to not be stretched beyond yield, resulting in the chipper chafer remaining wrinkle free.

The support beam 210 pivots about the support collar 214 due to actuation of an inflatable pusher 300. In the vicinity of the support collar 214, the support beam 210 has a tapered surface 215 that facilitates proper folding of the climbing bladder 206 thereon. The inflatable pusher 300 is located radially inward of the support beam and when inflated, causes the support beam to pivot about its second end, driving the first end 208 radially outward. During inflation of the climbing bladder, the nose 208 of the support beam 210 raises the second end 207 of the climbing bladder radially outward of the first end, to facilitate turnup of the ply. The climbing bladder is also inflated, so that the midportion 211 of the climbing bladder exerts a tremendous force to turn up the ply around the bead. The support beam facilitates the climbing bladder by raising up the outer lateral end of the climbing bladder in the radial direction. The bending backwards of the nose (about an axis perpendicular to the longitudinal axis of the beam) further contributes to the radial extension of the climbing bladder to facilitate turnup.

The inflatable pusher 300 can be replaced with a mechanical deck which raises and lowers to engage and lift the support beam, as shown in FIG. 20. The mechanical deck 500 may be made of metal and is pneumatically actuated to extend from the interior of the tire drum to actuate the support beam. The mechanical deck 500 is shaped like a fat tubular member having a first end and a second end, wherein the deck can be optionally tapered on a second end.

As shown in FIG. 14, The Inboard and Outboard drum units each comprise a plurality of telescoping tiles 90 which have a fixed portion 91 and a telescopic portion 94. Each individual tile 90 is linked to the bead locks by means of a link lever 92. The link lever 92 ensures the constant material length on the drum, from bead to bead, during the whole building sequence. Each tile 90 is axially extendable with a telescopic portion 94 that allows the decks to cover the full drum width variation and range. The telescopic portion 94 is slidable on over the top of the fixed tiles 91, and extended automatically by internal springs (not shown), inside the guiding unit.

For the full crown position, the tiles unit have a radial expander 96 that is actuated by a conical actuator 98. The conical actuator axially slides inward towards the center section upon actuation by air chamber 99 and air chamber 101 until the actuator engages mechanical stop (not shown) which attaches to the rear head of chamber 69a and stops on the rear head of chamber 101. As the conical actuator slides axially inward, the radial expander 96 slides on angled guide rails 97 located on the outer surface of the conical actuator. As the conical actuator slides axially inward towards the center section, the radial expander moves radially outward in order to expand the tiles in the full radial crown.

As the tiles 90 are linked to the bead lock segments 65 with the link levers 92, the bead locks are allowed to move axially inward because of the air chamber 101. When the bead lock chamber 69*a* is under pressure, the bead locks are expanding, releasing the link levers and allowing the tiles to expand with the bead lock strokes.

Figure 5:
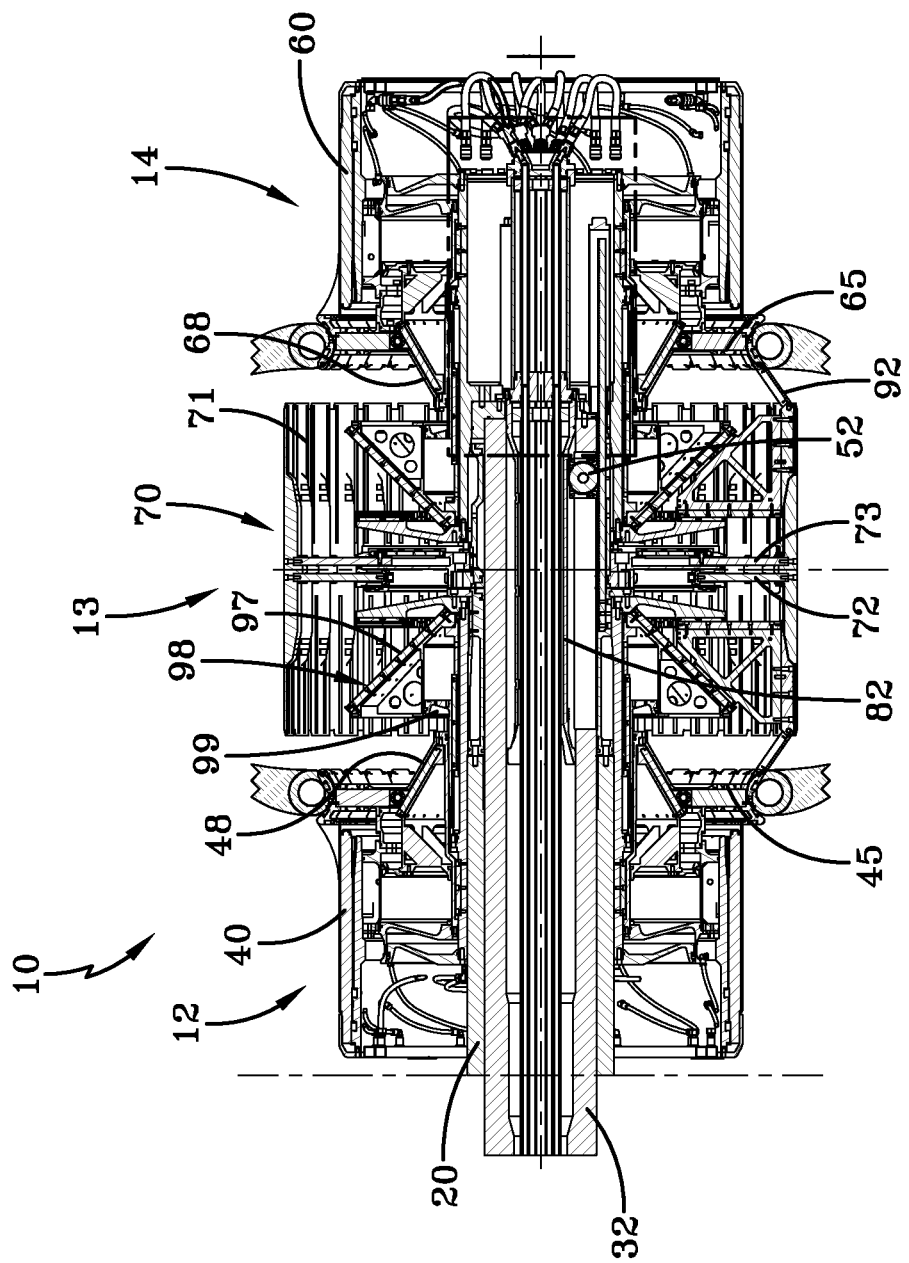

When the tire drum is in its axially collapsed position as shown in FIG. 5, the telescoping tiles 90 are fully retracted and are located underneath the tiles 71 of the center deck. Furthermore, the portions of the inboard unit and the outboard unit that are located axially inward (relative to the center section) of the bead locks are positioned inside of the center section tiles 71.

The sequence of building an exemplary tire utilizing the drum of the present invention is explained below. The tire drum as described below, can build a very large size tire on a full stage tire building drum. The drum can be adjusted for building a tire in a negative or positive crown position as desired. The axial drum motion, radial drum motion and bead lock motions and drum rotation are independently set, and adjustable. The tire building can be operated in a fully automated manner or in a manual mode to allow an operator to apply the tire building components to the drum. The components to be applied to the drum can be varied for a particular tire construction and are mentioned below to explain the operation of the drum. First, the drum is set to the start position as shown in FIG. 1. In the drum start position, the drum is in its axially expanded form with the drum having its maximum axial width, and minimum radial dimension. However, the start axial width may vary depending upon the tire size. The center section 70 and the outer sections 40, 60 are in their radially innermost positions, and the bead locks in the radially unexpanded position. Next, the tire components such as the inner liner, squeegee, chafer, insert pad, chipper, gum strips. Each of the tire building components is typically applied separately by a server as the drum is rotated by the spindle 20.

Figure 3:
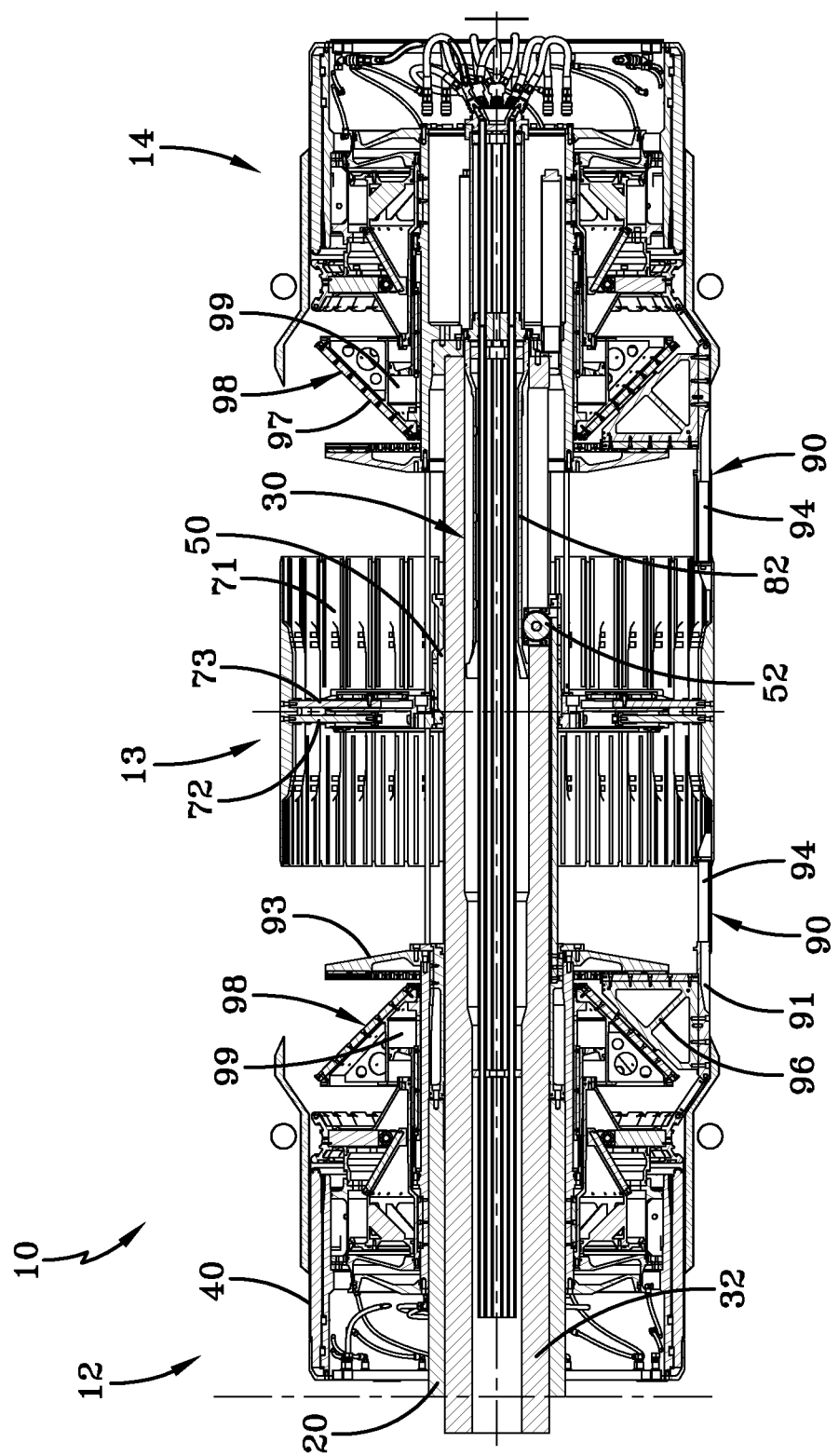
FIGS. 3-6 illustrate the tire building drum in various positions for building a tire.
Figure 4:
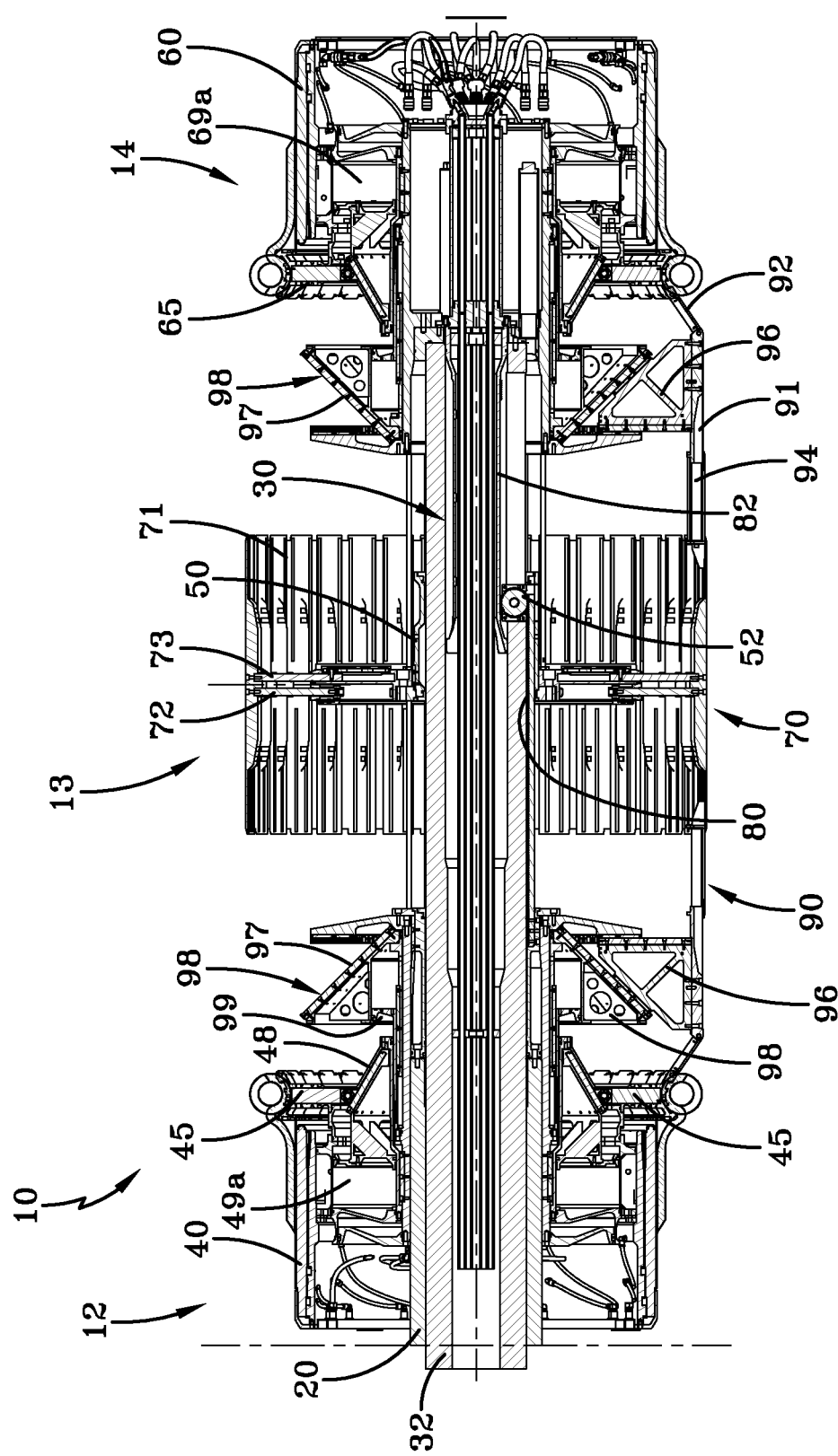

Next, the center section of the drum is radially expanded into a crowning position as shown in FIG. 3. The center section tiles 71 are radially expanded by actuation of the guide rods 72, 73, and the motion provided by chamber 101. After the center section is radially expanded, the ply is applied to the crowned drum. Next, the beads are positioned by a bead loader over the bead locks 45, 65. An apex is then applied to the beads and or drum. Alternatively, a bead apex subassembly may be used in place of the separate components. The bead locks are radially expanded to clamp the beads as shown in FIG. 4 by actuation of a conical actuator 48, 68 driven by pneumatic circumferential cylinders 49B, 69B. As the bead locks clamp the bead, the tiles 71 of the center section and the telescoping tiles are further expanded radially by actuation of the guide rods 72, 73 and actuation of the conical actuator to slide the radial expander, respectively. Additional tire components may then be applied such as gum strips and wedges.

Next, as the center of the drum remains in the high crown position, the center section 70 and the outboard section 60 are moved in an axially inward direction towards the inboard section 40 as shown in FIG. 5. The inboard section does not move axially during the drum operation. The center section 70 is mounted on a hub 50 secured to the axially sliding shaft 32. The hub's pinion gears 52 engage the movable rack 82 which is attached to the sliding shaft, causing the movable rack and sliding shaft to move axially inboard or towards the inboard section. The center section also moves toward the inboard section by the rotation of the pinion gears on the fixed rack 80. The axial movement of the center section is half the movement of the outboard section due to the gear ratios of the fixed rack and the movable rack. When the tire drum is in its axially collapsed position as shown in FIG. 5, the telescoping tiles 90 are fully retracted and are located underneath the tiles 71 of the center deck. Furthermore, the conical actuator 98 and radial expander 96 of the inboard unit and the outboard unit are positioned inside of the center section tiles 70.

When the drum is in the crowned and axially collapsed position as shown in FIG. 5, the carcass is inflated. Next the ply is turned up by actuating the climbing bladder. The climbing bladder is actuated by the inflatable pusher.

The bladders roll the carcass ply turnups and the sidewalls, if they have been previously attached, over onto the center section and carcass ply. Once the tire turnup ends are folded over, tire components such as the sidewall, tread base, tread cap, belt package can be applied. Next the bead lock is actuated to the unlocked position, the tire carcass is deflated, and the center section is moved radially inward to allow removal of the green tire.

FIGS. 21*a* and 21*b* pertain to a second embodiment of the bead lock mechanism of the invention. As shown in FIG. 21*b*, the bead seat 600 may further optionally comprise a first and second molded member 610,620. The first molded member 610 is preferably made of highly elastic silicone or silicone rubber mixture, that if molded in the shape of a trapezoid as shown in FIG. 21*a*. When the trapezoid is mounted in the curved bead seat, the first molded member changes shape into a curved piece that resembles a lower lip. The second member 620 is layered over the first member, and also preferably comprises a high elasticity silicone or silicone rubber mixture. The second member 620 has a first end 622 that extends over the linkage 92. The second member has a second end 623 that overlaps with the nose 206 of the support beam 210. The first and second member function to distribute the pressure load of the bead member during compression of the beads with the bead lock mechanism.

FIGS. 22*a-c* pertain to a third embodiment of the bead lock mechanism of the invention. As shown in FIG. 22*b*, the bead seat 700 may further optionally comprise a first and second molded member 720, 722. In this embodiment, the outer surface 702 of the bead lock has been revised. The outer surface has a first region that is located directly under the bead when the beads are locked. The first region 705 is almost flat, and has a very large radius curve in the range of about 60 to 150, more preferably 80 to 110. The first region has a second and third region 704, 706 located adjacent to, and on either side of the first region. The axially outer second region 706 has a substantially smaller radius, and is in the range of about 30 to 60, more preferably about 40-50. The axially inner third region 704 located on the other side and adjacent to the first region is substantially flat. A first and second elastic member 720, 722 is received in the bead seat 700. The first elastic member 720 is preferably made of highly elastic silicone or silicone rubber mixture that is molded in the desired shape. The shape of the elastic member 720 is an elongated strip with two opposed tapered ends 724, 726, as shown in FIG. 22*a*. The bottom of the strip has an enlarged projection 728 that is positioned under the bead when seated. The second member 722 is layered over the first member, and also preferably comprises a high elasticity silicone or silicone rubber mixture. The second member has a length sufficient to extend across the bead lock surface. The first and second member function to distribute the pressure load of the bead member during compression of the beads with the bead lock mechanism.

While certain representative embodiments and details have been shown for the purpose of illustrating the invention, it will be apparent to those skilled in this art that various changes and modifications may be made therein without departing from the spirit or scope of the invention.

What is claimed is:

1. A tire building drum comprising:
an inboard section, a center section and an outboard section,
the inboard section having a rotating spindle and a sliding shaft, wherein the sliding shaft is slidable within the spindle, wherein the inboard section has a radially expandable bead lock device mounted on the spindle,
said center section having an internal hub connected to the sliding shaft through a transmission so that movement of the sliding shaft causes movement of the hub, said center section further comprising a plurality of tiles that are each radially expandable;
wherein the outboard section of the drum is mounted on a distal end of the sliding shaft,
wherein the outboard section further has a radially expandable bead lock device;
wherein the center section and the outboard section are axially movable by sliding of the sliding shaft.

2. The tire building drum of claim 1 wherein the sliding shaft is configured to rotate in unison with the spindle.

3. The tire building drum of claim 1 wherein the inboard section is axially fixed.

4. The tire building drum of claim 1 wherein the radially expandable bead lock devices are axially movable.

5. The tire building drum of claim 1 wherein the inboard section and the outboard section each comprise a plurality of telescoping tiles.

6. The tire building drum of claim 5 wherein each telescoping tile is radially expandable.

7. The tire building drum of claim 5 wherein each telescoping tile has a fixed portion and an axially extending portion.

8. The tire building drum of claim 7 wherein the axially extending portion of each of the telescoping tiles overlap with a corresponding tile mounted on the center section.

9. The tire building drum of claim 1 wherein each bead lock device is connected to a first end of a respective link lever, and wherein a second end of each link lever is connected to a distal end of a respective telescoping tile.

10. The tire building drum of claim 1 wherein each bead lock device further includes a respective conical actuator, wherein each bead lock is configured to be actuated by a respective conical actuator.

11. The tire building drum of claim 1 wherein the transmission further comprises one or more pinion gears positioned between a fixed rack and a moving rack, wherein the moving rack is mounted on a external surface of the sliding shaft, and the fixed rack is located radially outward of the moving rack, wherein the one or more pinion gears are rotatable so as to provide sliding of the sliding shaft towards and away from the inboard section.

12. The tire building drum of claim 11 wherein the fixed rack is connected to the spindle.

13. The tire building drum of claim 1 wherein the centerline of the drum is variable by axially moving the sliding shaft.

14. A tire building drum comprising:
an inboard section, a center section and an outboard section,
the inboard section having a rotating spindle and a sliding shaft, wherein the sliding shaft is slidable within the spindle and configured to rotate with the spindle, wherein the inboard section is positionally fixed in the axial direction, wherein the inboard section has a radially expandable bead lock device mounted on the spindle,
said center section further including a plurality of radially expandable tiles and a hub connected to the sliding shaft through a transmission so that movement of the sliding shaft causes movement of the hub, wherein the hub has one or more pinion gears for engaging a fixed rack and a moving rack, wherein the moving rack is located inside of the sliding shaft, wherein rotation of the one or more pinion gears slide the shaft towards and away from the inboard section.

15. The tire building drum of claim 14 wherein the fixed rack is connected to the spindle.

16. The tire building drum of claim 14 wherein the fixed rack is located between a portion of the hub and the sliding shaft.

17. The tire building drum of claim 14 wherein the tire building drum is configured such that an axial distance traveled by the outboard section of the drum is greater than an axial distance traveled by the center section for a single rotation of the one or more pinion gears.

18. The tire building drum of claim 14 wherein the tire building drum is configured such that an axial distance traveled by the outboard section of the drum is twice as great as an axial distance traveled by the center section for a single rotation of the one or more pinion gears.

19. The tire building drum of claim 14 wherein the axial travel of the outboard section of the drum is 1.5 times as great as the axial travel of the center section for a single rotation of the pinion gears.

20. The tire building drum of claim 14 wherein the inboard section and the outboard section each comprise a plurality of telescoping tiles.

21. The tire building drum of claim 20 wherein each telescoping tile is radially expandable.

22. The tire building drum of claim 20 wherein each telescoping tile has a fixed portion and an axially extending portion.

23. The tire building drum of claim 22 wherein the axially extending portion of each telescoping tiles overlaps with a corresponding one of the tiles mounted on the center section.

24. A tire building drum comprising:
an inboard section, a radially expandable center section and an outboard section,
the inboard section having a rotating spindle and a sliding shaft, wherein the sliding shaft is slidable within the spindle and configured to rotate with the spindle, wherein the inboard section and the outboard section each have a fixed tile deck and a telescoping tile deck and a radially expandable bead lock mechanism;
said center section being mounted on the sliding shaft and further comprising a center deck having a plurality of radially expandable tiles;
wherein the outboard section of the drum is mounted on a distal end of the sliding shaft,
wherein the outboard section of the drum is axially movable by sliding of the sliding shaft while the inboard section is positionally fixed in the axial direction,
wherein the center section tile deck is configured so that it has a diameter larger than the outboard and inboard section tiles when the center section tile deck is in a radially expanded position.

25. The tire building drum of claim 24 wherein each fixed tile deck has a diameter less than a diameter of each telescoping tile deck.

26. The tire building drum of claim 9 wherein the link levers are adjustable from an angle of 0 to 30 degrees with respect to a line parallel to the sliding shaft.

27. The tire building drum of claim 1 further comprising a sealing membrane, wherein the sealing membrane has a first end mounted on a bead saddle of a respective bead lock of a respective bead lock device, and a second end mounted on an interior portion of the drum, wherein the sealing membrane has an expansion portion.

28. The tire building drum of claim 27 wherein the expansion portion is a foldable rubber reinforced by one or more layers of steel ply.

29. The tire building drum of claim 27 wherein the expansion portion has one or more folds.

30. The tire building drum of claim 1 further comprising a climbing bladder, wherein the climbing bladder has a first end mounted on a bead saddle of a respective bead lock device, and a second end mounted to a support beam.

31. The tire building drum of claim 30 wherein the support beam has a support beam first end and a support beam second end, wherein the support beam is pivotable about the support beam first end, and is made of reinforced rubber.

32. The tire building drum of claim 31 wherein an inflatable pusher that is arranged to engage the support beam when inflated, causing the support beam to pivot about its support beam first end, raising the second end of the climbing bladder radially outward.

33. The tire building drum of claim 30 wherein the climbing bladder is replaced with a mechanical deck.

34. The tire building drum of claim 1 wherein each tile of the plurality of tiles of the center section connects with a respective tile of the inboard section and a respective tile of the outboard section to form a tire building surface.

* * * * *